United States Patent [19]
Fischer et al.

[11] Patent Number: 5,623,449
[45] Date of Patent: Apr. 22, 1997

[54] FLAG DETECTION FOR FIRST-IN-FIRST-OUT MEMORIES

[75] Inventors: Frederick H. Fischer, Macungie; Kenneth D. Fitch, Allentown, both of Pa.

[73] Assignee: Lucent Technologies Inc., Murray Hill, N.J.

[21] Appl. No.: 514,199

[22] Filed: Aug. 11, 1995

[51] Int. Cl.$^6$ .............................. G11C 7/00; G11C 29/00
[52] U.S. Cl. ........................... 315/200; 365/221; 365/239
[58] Field of Search ..................................... 365/200, 221, 365/239; 371/10.2

[56] References Cited

U.S. PATENT DOCUMENTS 5,345,419  9/1994  Fenstermaker et al. ............ 365/189.04
5,357,473  10/1994  Mizuno et al. ...................... 365/200 X
5,469,398  11/1995  Scott et al. ............................. 365/221
5,502,655  3/1996  McClure ............................. 365/221 X

*Primary Examiner*—David C. Nelms
*Assistant Examiner*—Huan Hoang
*Attorney, Agent, or Firm*—James H. Fox

[57] ABSTRACT

A technique is provided for setting an error status bit in a first-in, first-out memory having data words with associated error bits. When a word having an associated error bit that is set to indicate an error is written into the FIFO, the write pointer is captured, and a flag is set, indicating that the FIFO has a word with an error. If a second word is written which has an error, that pointer value is captured, overwriting the current value. As the FIFO is read, the read pointers are compared with the captured write pointer. When the values are equal, and the FIFO is read, the flag is cleared, indicating that there are no more errors in the FIFO. In an exemplary case, each word in the FIFO has 8 data bits and 3 error bits. A FIFO used in implementing a UART in a modem typically includes 16 or 32 words.

16 Claims, 1 Drawing Sheet

FLAG DETECTION FOR FIRST-IN-FIRST-OUT MEMORIES

BACKGROUND OF THE INVENTION

Description of the Prior Art

In many communications applications, a conversion is performed between data in serial format and parallel format. For example, a Universal Asynchronous Receiver/Transmitter (UART) is used to send and receive serial data to and from terminal equipment that operates on data words, with each word typically comprising 8 data bits. The terminal equipment may comprise a modem connected to a personal computer (PC), for example. In one widely used UART, the National 16550, there is a 16 word first-in, first-out memory (FIFO) for each of the transmit and receive data paths. In addition to the 8 data bits, each receive word has 3 associated error bits. These error bits allow the receiving modem to determine whether errors in transmission have occurred, and to give an indication of the nature of the errors. In this manner, retransmission of data front the transmit modem may be requested to correct for missing or corrupted data.

An illustration of the receive FIFO is given in FIG. 1, wherein the receive FIFO 100 holds 8 bits of data in each receive word (e.g., 101), and 3 bits of error information (e.g., 102) associated with each receive word. A status flag (not shown) in the 16550 is used to indicate whether any word in the FIFO has an error bit set. This bit can be used by PC driver software to simplify and speed up the reading of data. By reading this bit (once) the driver software knows if the data in the FIFO is error free or not. If it is error tree, then the PC can quickly read the block of data, and ignore (i.e. NOT READ, thus saving time) the error information. If an error does exist, it can slowly flush the FIFO (by reading twice, once to get the data word, and a second read to get error status) and determine what the error is, and what its consequences are, or simply ask the far side to retransmit the block of data. When the data in the FIFO is over-written with error-free data, the error flag is reset.

Referring to FIG. 2, the status bit is computed by "OR"ing the error bits ($E_1$, $E_2$, $E_3$) in each word of the FIFO. Since there are 16 words with 3 errors bits per word, this requires a 16×3=48 bit OR operation. This may be accomplished with a single OR gate having 48 inputs, or more typically with multiple OR gates (e.g., 201,202,203) having a fewer number of inputs, as illustrated. With the increase in modem speed, there is interest in increasing the number of words in the FIFOs to 32 or even 64 words, which increases the width of the "OR" gate to 96 or 192 inputs. This results in larger and larger arrays of OR-ing, in addition to the circuitry required to access the error bits of the FIFO. As FIFO sizes increase, this means larger circuits and delays in computing the status bit. In addition, a means must be provided in the prior-art technique for clearing the error bits when read. Otherwise, the OR circuitry will falsely show an error, even after the word has been read.

SUMMARY OF THE INVENTION

We have invented a technique for setting an error status bit in a first-in, first-out memory having data words with associated error bits. When a word having an associated error bit that is set to indicate an error is written into the FIFO, the write pointer is captured, and a flag is set, indicating that the FIFO has a word with an error. If a second word is written which has an error, that pointer value is captured, overwriting the current value. As the FIFO is read, the read pointers are compared with the captured write pointer. When the values are equal, and the FIFO is read, the flag is cleared, indicating that there are no more errors in the FIFO.

DETAILED DESCRIPTION

The following detailed description relates to a first-in first-out memory that provides for improved error flag detection. In the present technique, when a word which has an associated error bit set is written into the FIFO, the write pointer is "captured". That is, the address of the write pointer is transferred into a latch, referred to herein as the "bad pointer" latch. In addition, a flag is set, indicating that the FIFO has a word with an error. If a second word is written which has an error, that pointer value is captured, overwriting the current value in the bad pointer latch. As the FIFO is read, the location of the read pointer is compared with the location of the bad pointer. When the values are equal, and the FIFO is read, the flag is cleared, indicating that there are no more errors in the FIFO. While the FIFO that is used in implementing the present invention may be of any suitable design, one especially advantageous FIFO design is given in U.S. Pat. No. 5,345,419 co-assigned herewith, with is incorporated herein by reference.

Figure 1:
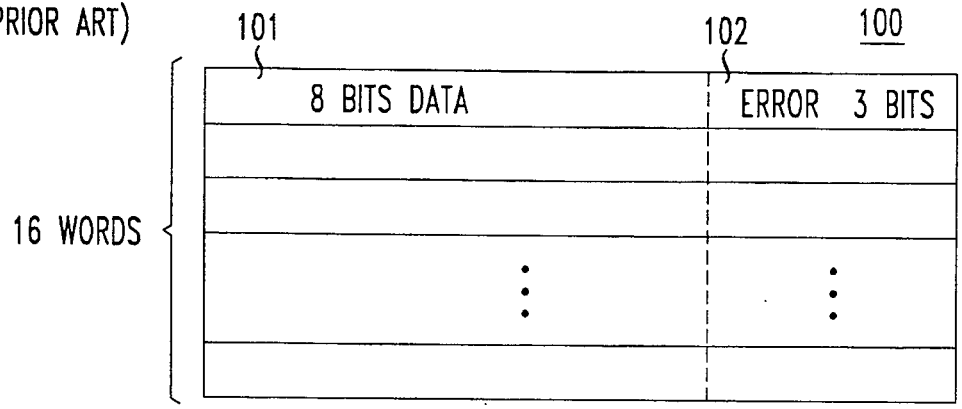
FIG. 1 shows a prior-art FIFO having data bits and associated error bits.
Figure 2:
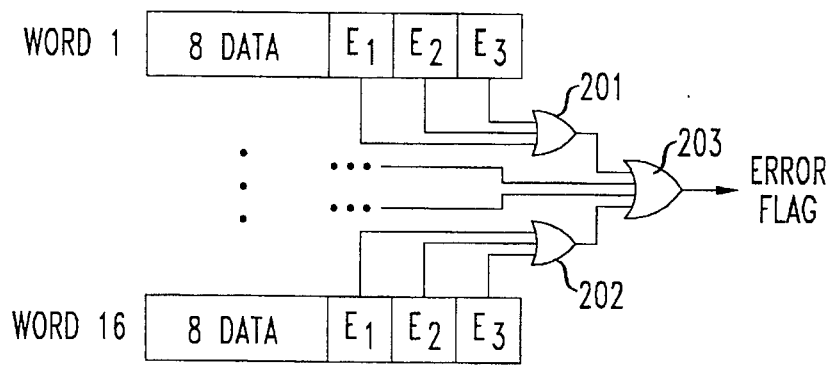
FIG. 2 shows a prior-art technique for "OR"ing the error bits to generate an error flag.
Figure 3:
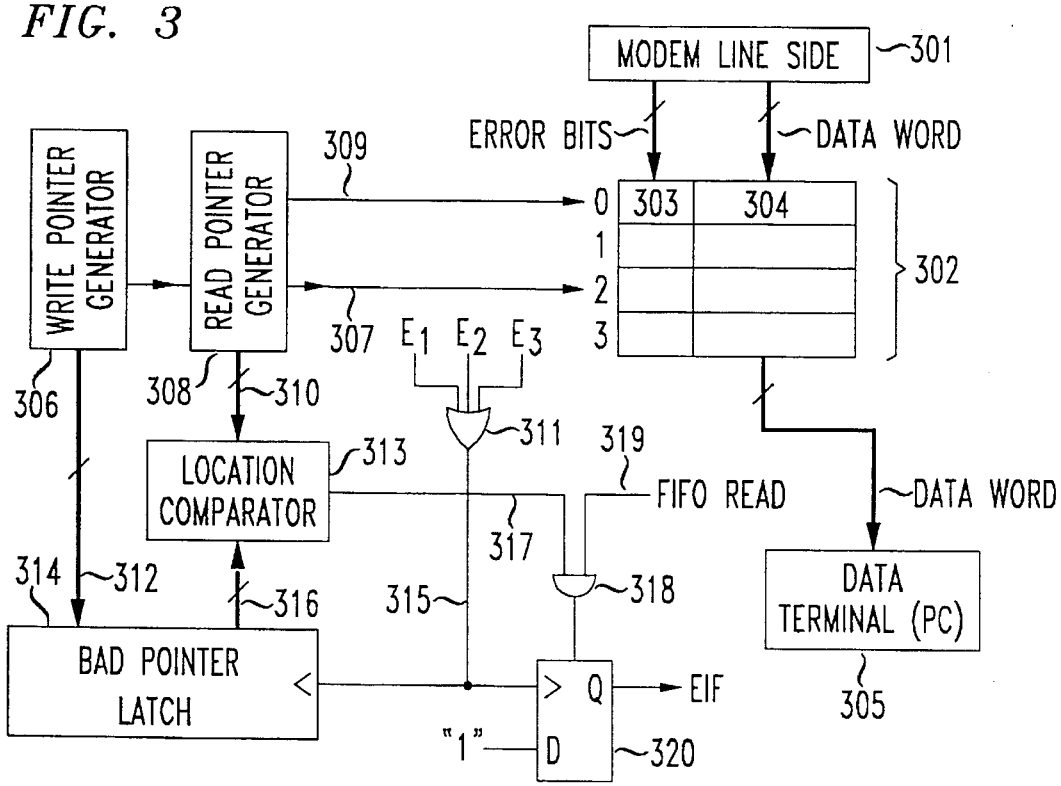
FIG. 3 shows an embodiment of the invention.

An illustrative embodiment of the invention is shown in FIG. 3, with others implementations being possible. Referring to FIG. 3, a modem 301 provides data words received over a communications channel (e.g., telephone line) to a FIFO 302. The FIFO comprises four locations (0 to 3) in the illustrative case, each location comprising an error portion (e.g., 303) and a data portion (e.g., 304). The most recently received data word is written into the memory location designated by the write pointer 307, being location "2" as shown in FIG. 3. Error bits that are determined to be present by the modem 301 and associated with the given data word are also placed in the designated location in the error portion. As subsequent data words are received by the modem 301, the write pointer moves successively from location 2 to the other locations 3, 0, 1, 2, etc. in a manner well known in the art. Similarly, the read pointer 309 designates the location from which data is to be transferred from the FIFO into the data terminal 305. The read pointer is shown at location 0 in the illustrative case, but also moves successively to locations 1, 2, 3, etc. as known in the art.

The write pointer generator 306 supplies the address of the write pointer 307 to the bad pointer latch 314 over address bus 312. The error bit comparator 311 determines whether any of the error bits ($E_1$, $E_2$, $E_3$) associated with the data word designated by the write pointer indicates an error. That is, the error bit comparator 311 determines whether any of the three bits in the error portion of the given location equals "1", thereby indicating an error in the illustrative case. If an error is indicated, a high (logic "1") signal is placed on line 315 by the error bit comparator 311; otherwise, the line 315 remains low (logic "0"). The line 315 connects to the clock input of edge-triggered bad pointer latch 314. Therefore, when an error is detected, the 0 to 1 transition on line 315 causes the bad pointer latch to latch the address bits of the location of the write pointer, referred to as "capturing the write pointer" herein. In a typical implementation, the error bit comparison occurs before the data word designated by the write pointer is actually written. This allows the capture of the write pointer and the setting of the EIF flag (discussed below) to occur simultaneously with the write of the data. Any previous address bits are overwritten each time the write pointer is captured. Therefore, the bad pointer latch 314 always contains the location (address bits) of the most recently written data word that includes errors.

The location thus captured by the bad pointer latch 314 is provided to the location comparator 313 via bus 316. In addition, the read pointer generator 308 provides the location of the read pointer to the location comparator 313 via the address bus 310. The location comparator 313 then compares these locations, thereby determining whether the read pointer has reached the location of the bad pointer. If a match is indicated, the location comparator 313 provides a high signal ("1") on the line 317, which is connected to an input of AND gate 318. The other input of AND gate 318 (line 319) is supplied with a FIFO READ signal that goes high when the FIFO is being read. The output of AND gate 318 is connected to the asynchronous reset input of DQ latch 320. Therefore, when a match is indicated by line 317 and the FIFO is being read, the Q output of latch 320 is reset, so that the EIF flag is reset to the low state ("0"). This is referred to as clearing the EIF flag, thereby indicating that all the errors in the FIFO have been cleared out. In a typical implementation, the read pointer is updated so as to be equal to the location of the bad pointer at the end of the read immediately preceding the match. However, the clearing of the EIF flag occurs only when the data word in the current location designated by the read pointer is actually read.

While FIG. 3 illustrates the invention with various circuit functions, other circuitry may be included. For example, in a typical case the asynchronous nature of the writing and reading of the FIFO implies that care should be taken to ensure that any new write of data with an error will set the EIF flag even if a simultaneous read is occurring which would otherwise clear the flag. This can be accomplished using circuit techniques known in the art.

An Example is given below for a 4 word FIFO comprising memory locations 0 to 3. In the Example below, the FIFO includes 3 error bits and 8 data bits, grouped accordingly. In addition, WP is the location of the Write Pointer, RP is the location of the Read Pointer, BP is the location of the Bad Pointer (the location most recently written with an error), and EIF is the Error In Fifo flag:

| LOCATION | FIFO | WP | RP | BP | EIF |
|---|---|---|---|---|---|
| 0 | 000 00000000 | 0 | 0 | 0 | 0 |
| 1 | 000 00000000 | | | | |
| 2 | 000 00000000 | | | | |
| 3 | 000 00000000 | | | | |

A write sequence occurs in which the data words in locations 1 and 2 have an associated error bit set. The arrow points to the location of the write pointer in this sequence. After writing to the location shown, the write pointer is updated to point to the next location. For example the write pointer is updated to location 1 after the write to location 0.

| LOCATION | FIFO | WP | RP | BP | EIF |
|---|---|---|---|---|---|
| Write 0: | | | | | |
| →0 | 000 01100110 | 0 | 0 | 0 | 0 |
| 1 | 000 00000000 | | | | |
| 2 | 000 00000000 | | | | |
| 3 | 000 00000000 | | | | |
| Write 1: | | | | | |
| 0 | 000 01100110 | 1 | 0 | 1 | 1 |
| →1 | 001 10000000 | | | | |
| 2 | 000 00000000 | | | | |
| 3 | 000 00000000 | | | | |
| Write 2: | | | | | |
| 0 | 000 01100110 | 2 | 0 | 2 | 1 |
| 1 | 001 10000000 | | | | |
| →2 | 010 01000000 | | | | |
| 3 | 000 00000000 | | | | |
| Write 3: | | | | | |
| 0 | 000 01100110 | 3 | 0 | 2 | 1 |
| 1 | 001 10000000 | | | | |
| 2 | 010 01000000 | | | | |
| →3 | 000 00001011 | | | | |

Thereafter, a read sequence occurs in which the read pointer advances to the location of the write pointer, being location 3 in this case. Note that the arrow indicates the location of the read pointer in this sequence:

| LOCATION | FIFO | WP | RP | BP | EIF |
|---|---|---|---|---|---|
| Read 0: | | | | | |
| →0 | 000 01100110 | 3 | 0 | 2 | 1 |
| 1 | 001 10000000 | | | | |
| 2 | 010 01000000 | | | | |
| 3 | 000 00001011 | | | | |
| Read 1: | | | | | |
| 0 | 000 01100110 | 3 | 1 | 2 | 1 |
| →1 | 001 10000000 | | | | |
| 2 | 010 01000000 | | | | |
| 3 | 000 00001011 | | | | |
| Read 2: | | | | | |
| 0 | 000 01100110 | 3 | 2 | 2 | 0 |
| 1 | 001 10000000 | | | | |
| →2 | 010 01000000 | | | | |
| 3 | 000 00001011 | | | | |
| Read 3: | | | | | |
| 0 | 000 01100110 | 3 | 3 | 2 | 0 |
| 1 | 001 10000000 | | | | |
| 2 | 010 01000000 | | | | |
| →3 | 000 00001011 | | | | |

Note that the Error In HFO flag (EIF) was reset to "0" when the read pointer reached the location of the bad pointer, being location 2 in the illustrative case. The FIFO is then available to receive more data that may be written in to the locations and read therefrom in a comparable manner. The above embodiment has shown clearing the EIF flag when the read pointer has caught up to the bad pointer. However, other techniques for clearing the EIF flag are possible. For example, when a certain incoming error condition occurs, then the entire memory may be cleared, and the EIF flag reset. Also, the HFO and associated circuitry described above are typically implemented on a single integrated circuit (IC). However, various portions of the circuitry may be included on separate integrated circuits if desired. A FIFO that utilizes the present invention is typically included in the UART portion.

The invention claimed is:

1. A first-in, first-out memory comprising:

a plurality of memory locations, each location comprising a data portion for storing a data word and an error portion for storing at least one error bit;

a read pointer for designating a location that is read from, and a write pointer for designating a location that is written to; and an error flag for indicating that at least one error bit is stored in an error portion;

characterized in that said memory further comprises a bad pointer latch for latching the current location of said write pointer when at least one error bit is written into the error portion of said current location.

2. The invention of claim 1 further comprising a comparator for comparing the location of the read pointer and the location that is latched in said bad pointer latch, and clearing means connected to said comparator for clearing said error flag when the location of said read pointer matches the location that is latched in said bad pointer latch.

3. The invention of claim 2 wherein said clearing means clears said error flag after the data word is read from the location designated by said read pointer.

4. The invention of claim 1 wherein said memory, said read pointer, said write pointer and said flag bit are located on the same integrated circuit.

5. The invention of claim 1 wherein said data portion comprises 8 bits, and said error portion comprises 3 bits.

6. The invention of claim 1 wherein said memory comprises 16 locations.

7. The invention of claim 1 wherein said memory comprises 32 locations.

8. The invention of claim 1 wherein said memory comprises 64 locations.

9. A modem that includes a universal asynchronous receiver/transmitter having a first-in, first-out memory comprising:

a plurality of memory locations, each location comprising a data portion for storing a data word and an error portion for storing at least one error bit;

a read pointer for designating a location that is read from, and a write pointer for designating a location that is written to; and an error flag for indicating that at least one error bit is stored in an error portion;

characterized in that said memory further comprises a bad pointer latch for latching the current location of said write pointer when at least one error bit is written into the error portion of said current location.

10. The invention of claim 9 further comprising a comparator for comparing the location of the read pointer and the location that is latched in said bad pointer latch, and clearing means connected to said comparator for clearing said error flag when the location of said read pointer matches the location that is latched in said bad point latch.

11. The invention of claim 10 wherein said clearing means clears said error flag after the data word is read from the location designated by said read pointer.

12. The invention of claim 9 wherein said memory, said read pointer, said write pointer and said flag bit are located on the same integrated circuit.

13. The invention of claim 9 wherein said data portion comprises 8 bits, and said error portion comprises 3 bits.

14. The invention of claim 9 wherein said memory comprises 16 locations.

15. The invention of claim 9 wherein said memory comprises 32 locations.

16. The invention of claim 9 wherein said memory comprises 64 locations.

* * * * *